United States Patent [19]

Kaneko et al.

[11] Patent Number: 4,965,841
[45] Date of Patent: Oct. 23, 1990

[54] LUMINANCE CUMULATIVE INTEGRATING METHOD AND APPARATUS IN IMAGE PROCESSES

[75] Inventors: Yasuhiro Kaneko, Kariya; Shinzo Ito, Aichi, both of Japan

[73] Assignee: Nippondenso Co., Ltd., Kariya, Japan

[21] Appl. No.: 253,960

[22] Filed: Oct. 4, 1988

Related U.S. Application Data

[63] Continuation of Ser. No. 881,322, Jul. 2, 1986, abandoned.

[30] Foreign Application Priority Data

Jul. 5, 1985 [JP] Japan ................................ 60-148944

[51] Int. Cl.$^5$ .......................................... G06K 9/00
[52] U.S. Cl. .......................................... 382/1; 382/25; 364/431.05; 358/100; 431/79
[58] Field of Search ............................. 358/100, 101; 364/431.05, 107; 382/1, 18, 20, 25, 28, 48, 51, 52, 56, 61; 431/79

[56] References Cited

U.S. PATENT DOCUMENTS

| | | | |
|---|---|---|---|
| 4,021,778 | 5/1977 | Ueda et al. | 382/25 |
| 4,162,481 | 7/1979 | DuVall | 382/52 |
| 4,326,258 | 4/1982 | de la Guardia | 382/52 |
| 4,528,634 | 7/1985 | Nakahata et al. | 364/518 |
| 4,555,800 | 11/1985 | Nishikawa et al. | 382/25 |
| 4,555,802 | 11/1985 | Fedak et al. | 382/56 |
| 4,606,635 | 8/1986 | Niyazawa et al. | 358/106 |
| 4,620,491 | 11/1986 | Nishikawa et al. | 431/79 |
| 4,628,465 | 12/1986 | Ito et al. | 382/52 |
| 4,653,998 | 3/1987 | Sohma et al. | 431/79 |

*Primary Examiner*—David K. Moore
*Assistant Examiner*—Jose L. Couso
*Attorney, Agent, or Firm*—Cushman, Darby & Cushman

[57] ABSTRACT

A luminance cumulative integrating method in image processes comprises the steps of: storing the positions of all of the unit regions constituting at least one block region to be detected as position information into a plurality of memory areas whose readout order has been predetermined in one direction; storing the luminances at the respective positions of an optical image as luminance information corresponding to the position information; sequentially outputting the position information from the plurality of memory areas; taking out the luminance information corresponding to the position information from the luminance information stored; adding the luminance information; and thereby obtaining the block luminance of at least one block region.

14 Claims, 7 Drawing Sheets

LUMINANCE CUMULATIVE INTEGRATING METHOD AND APPARATUS IN IMAGE PROCESSES

This is a continuation of application Ser. No. 06/881,322, filed July 2, 1986, which was abandoned upon the filing hereof.

BACKGROUND OF THE INVENTION

The present invention relates to a luminance cumulative integrating method and apparatus in image processes to obtain the luminance of an arbitrary block region of the state to be detected.

Hitherto, the luminance of an arbitrary block region of the state to be detected is obtained in the following manner. Namely, the luminances corresponding to the respective coordinates constituting this block region are extracted from an image memory device for storing coordinate information and luminance information corresponding thereto. These luminances are sequentially added and the whole luminance of the foregoing block region, namely, the block luminance is obtained. This means is executed by softwares for mainly executing the processes with respect to the programs from the viewpoint of detecting the block luminance of an arbitrary block region.

According to such conventional means, the block luminance is obtained by the processes due to the programs. Therefore, the number of steps for the arithmetic operating processes of the programs increases in dependence on the shapes of block regions and the number of block regions. Namely, the operating time to obtain one or a plurality of block luminances is not always short.

SUMMARY OF THE INVENTION

It is an object of the present invention to provide a luminance cumulative integrating method and its apparatus in image processes in which the foregoing operating time is reduced and the function is improved.

Another object of the invention is to provide a luminance cumulative integrating method and its apparatus in image processes comprising the steps of: storing the positions of all of the unit regions constituting at least one block region to be detected as position information into a plurality of memory areas whose readout order has been predetermined in one direction; storing the luminances at the respective positions of an optical image as luminance information corresponding to an address of an image memory sequentially outputting the position information from those plurality of memory areas; taking out the luminance information at the address corresponding to a position information from the image memory; adding these luminance information; and obtaining the block luminance of at least one block region.

The term "block region" denotes the region which is constituted by one or more unit regions. The term "unit region" indicates the region which is set in accordance with an accuracy to be measured. This unit region is the element region surrounded by a line element of a constant length or the region composed of a set of these element regions. It is assumed that the unit region also incorporates the line element as a wide meaning.

The position information is the data to specify all of those unit regions constituting a block region. The position information needs to be stored into a plurality of memory areas whose readout order has been predetermined in a single direction. However, if the position information which will be stored into a plurality of memory areas is stored without overlapping all of the unit regions, the storing order is not particularly specified. It is desirable to sequentially actively output the position information at predetermined time intervals in accordance with the readout order mentioned above. On the other hand, in the case of storing the position information of a plurality of block regions, it is desirable that the next memory area of the edge portion of one block region stores a block decision signal indicative of this edge portion as the position information. As the position information, for example, the coordinate values of X and Y (or X, Y, Z) in the orthogonal coordinate system, the radius vector, angle $\theta$, in the polar coordinate system and the like can be used. When a plurality of block regions are set, the check code to distinguish the respective block regions needs to be provided.

As a method of storing the position information, it is desirable to convert the position information to digital values and store them. In the actual case, for example, magnetic disk, optical disk, ROM, RAM, or the like can be used as a storage medium which can be constituted as a position information memory unit.

Each position of the optical image denotes the position which unconditionally corresponds to the position indicated by the position information mentioned above. For example, in the case of using a CCD array as a photoelectric converting element, an optical image is converted to an electric signal and the unit region may be also constituted by one pixel or four square pixels or the like. It is desirable to set the size of the unit region in accordance with the accuracy of the result of the arithmetic operation to be derived.

The luminance of the optical image at the respective positions need to be stored into, for example, the image memory device as the luminance information corresponding to the respective positions. It is desirable that when the image memory device has received the position information, it actively outputs the luminance information corresponding to the position information. When considering the processing speed of the whole system using the present invention, it is desirable to store the luminance information as a digital signal corresponding to the light and dark. In this case, the storage medium similar to the medium which is used in the position information memory device can be also used. The luminance information output from the image memory device is added and the block luminance of at least one block region is obtained. This addition can be realized by providing, e.g., an arithmetic operating device. As the arithmetic operating device, for instance, accumulator, microcomputer, or the like may be used.

According to the present invention, there is provided a luminance cumulative integrating method in image processes comprising the steps of: storing the positions of all of the unit regions constituting at least one block region to be detected as position information into a plurality of memory areas whose readout order has been predetermined in one direction; storing the luminances at the respective position of an optical image as luminance information corresponding to the address of the image memory; sequentially outputting the position information from those plurality of memory areas; taking out the luminance information at the address corresponding to the position information from the image memory; adding these luminance information; and obtaining the block luminance of at least one block region.

The block luminance of at least one block region is derived due to such a luminance cumulative integrating method as described above; therefore, the signal processing time is reduced and the block luminance of this block region is derived at a high speed.

BRIEF DESCRIPTION OF THE DRAWINGS

FIGS. 3 to 5 are diagrams for explaining a method of measuring the pattern of a spray material in the apparatus of the embodiment, in which FIG. 3 is an explanatory diagram showing the shape of the spray material as addresses, FIG. 4 is an explanatory diagram of a window $W_i$ as a block region, and FIG. 5 is a diagram for explaining the storing order of the data in the window $W_i$ shown in FIG. 4;

DESCRIPTION OF PREFERRED EMBODIMENT

Figure 1:
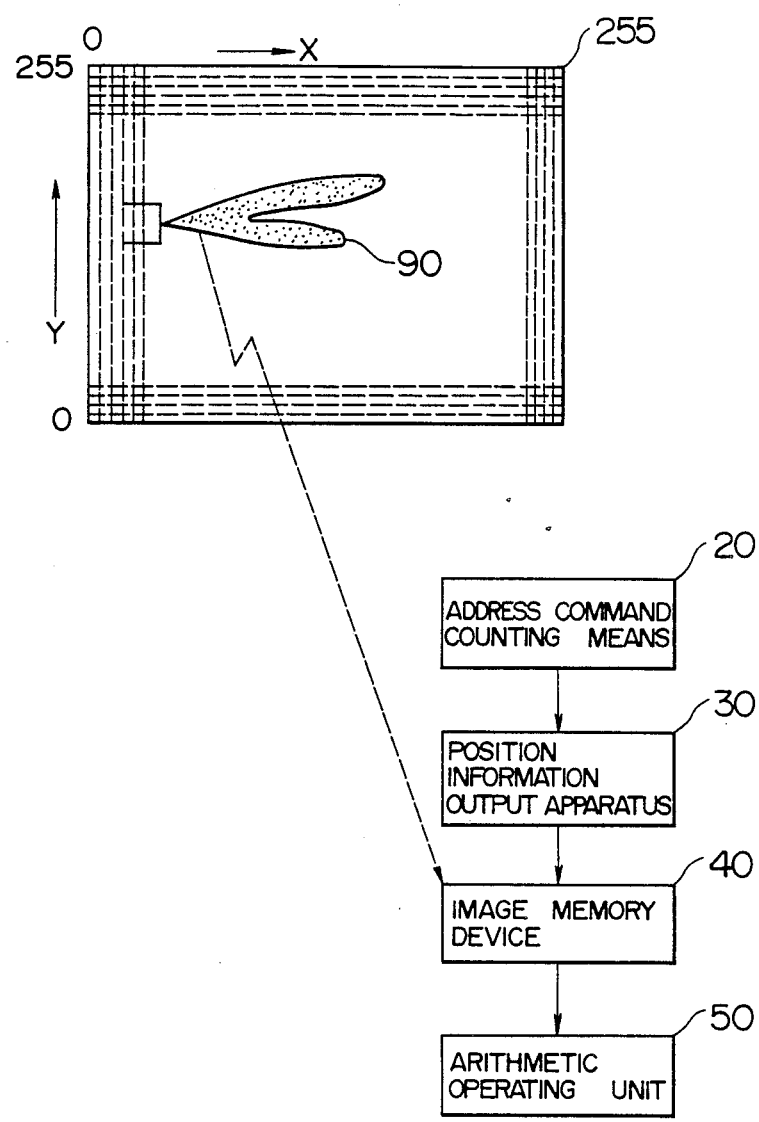
FIG. 1 is a block diagram showing the concept of an apparatus of the present invention.

FIG. 1 shows a block diagram of a luminance cumulative integrating apparatus in image processes according to the present invention.

The luminance cumulative integrating apparatus according to the invention comprises:

an image memory device 40 for storing the luminance at the respective positions of an optical image as luminance information at an address corresponding to each position;

address command counting means 20 which sequentially increases or decreases and outputs a read address signal to instruct a position information output apparatus 30 from which data should be read out;

a position information output apparatus 30 for storing the positions of all of the unit regions constituting at least one block region to be detected as position information into a plurality of memory areas whose readout order has been predetermined in one direction, receiving the read address signal from the address command counting means, and outputting the position information indicative of the positions stored in the memory areas which are designated by the read address signal; and an arithmetic operating unit 50 for reading out of the image memory device the luminance information at addresses which are designated by the position information from the position information output apparatus and sequentially adding these values.

Figure 2:
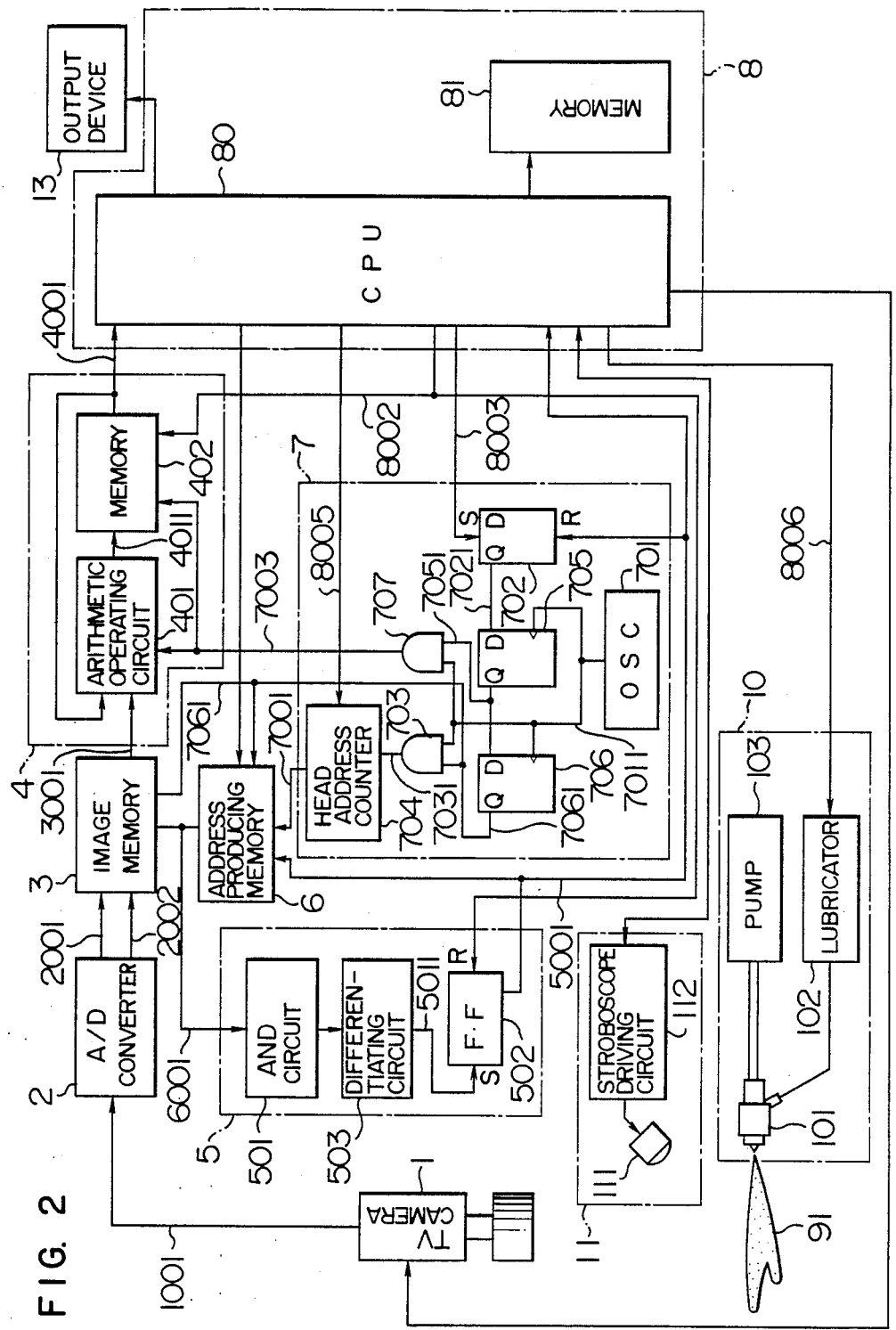
FIG. 2 is a block diagram showing a constitution of the apparatus of the invention.

FIG. 2 is a block diagram showing a practical constitution of the luminance cumulative integrating apparatus in the image processes according to the present invention. This embodiment relates to the case where the invention is applied to an apparatus for measuring the spray pattern of an internal combustion engine.

The luminance cumulative integrating apparatus in the image processes comprises mainly: a fuel injecting apparatus 10; a light emitting device 11 for irradiating a spray material 91; a television camera 1 for picking up a video image of the spray material 91; an image A/D converter 2 for converting the video signal which is output from the television camera 1 to the digital signal; an image memory 3 corresponding to the image memory device 40 for storing the signal from the A/D converter 2; a cumulative adder 4 corresponding to the arithmetic operating unit 50, for adding the luminance signals which are input from the image memory 3; an end detecting circuit 5 for detecting the end of the addition; an address producing memory 6 corresponding to the position information output apparatus 30 for storing address data to specify the block region and outputting this address data as necessary; an address generating counter 7 corresponding to the address command counting means 20 for instructing the memory 6 to increase the address; a microcomputer 8 (hereinafter, abbreviated as a computer 8; this computer 8 has an input/output interface not shown) for mainly executing the arithmetic operation and centralized control; and an output device 13 for outputting the result of the arithmetic operation.

The fuel injecting apparatus 10 has a nozzle 101. A fuel is injected from the nozzle 101 and the spray material 91 is formed. The pressurized fuel is sent from a lubricator 102 to the nozzle 101 by an injection pump 103. The pump 103 is driven by a motor through a pulley.

The television camera 1 is composed of an image pickup section and a controller section to control it. The controller section horizontally and vertically scans the image pickup section and outputs a video signal to the image A/D converter 2.

The converter 2 is the electric circuit to sample the video signal in correspondence to the plane coordinates of each pixel, i.e., sample for every pixel, to convert the resultant data to the digital signal, and to output an address signal 2001 and a luminance data signal 2002. For the address signal 2001, the pulse signal in which a vertical sync signal serves as a start point (address 0) and one horizontal scanning line is divided into 256 dots is output. One pixel is allowed to correspond to one dot. This address signal is synchronized with the horizontal sync signal for every 256 pulses. The address AD (X, Y) of the pixel of the X-th dot on the Y-th horizontal scanning line in the case where this dot was measured from the horizontal scan signal is written by the following expression. Namely, $$AD\ (X,\ Y) = 256\ (Y-1) + X \qquad (1)$$

Figure 4:
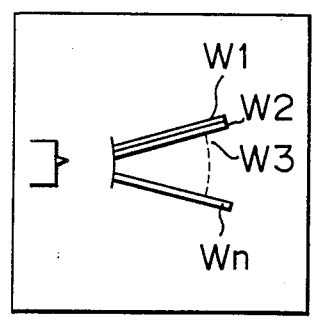

A block region $W_i$ consisting of these pixels, i.e., the window $W_i$ (i=1, 2, 3, ...) is shown in FIG. 4. $AD\overline{W}_{ij}$ represents an address storing a j-th pixel in pixels constituting an i-th window $W_i$.

The image memory 3 is the device to store the digital signal input from the image A/D converter 2.

The cumulative adder 4 comprises: an arithmetic operating circuit 401 to add luminance data in correspondence with a luminance signal 3001 from the image memory 3 and a signal from the address generating counter; and a memory 402 to store a signal from the operating circuit 401.

The end detecting circuit 5 comprises: an AND circuit 501 to detect an end signal 6001 indicative of the end of block region which is output from the memory 6; a differentiating circuit 503 which receives a signal from the AND circuit 501; and an RS flip-flop circuit (hereinafter, abbreviated as an RS-FF) 502 which receives a set signal from the differentiating circuit 503 and also receives a reset signal from the computer 8.

Figure 5:
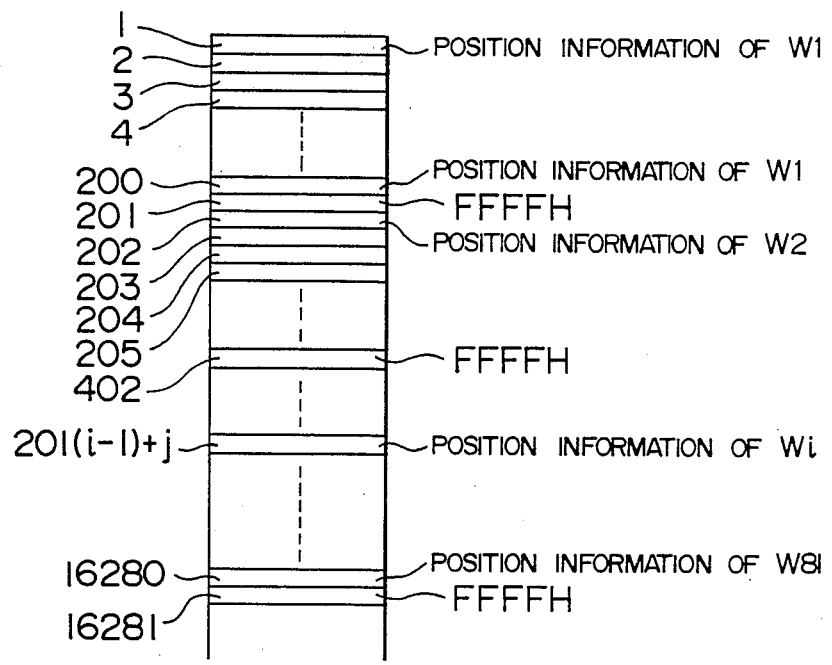

The address producing memory 6 stores an address $ADW_{ij}$ $(X_1Y)$ as position information; to specify the block regions $(W_1, W_2, \ldots$ as shown in FIG. 4) input from the computer 8 as shown in FIG. 5 and outputs the image address signal 6001 in response to an address signal 7001 from the address generating counter 7.

The counter 7 outputs to the memory 6 the address signal 7001 which was sequentially counted up by a start signal 8003 from the computer 8.

The computer 8 is composed of a CPU 80 and a memory 81 to store the programs and the like.

The light emitting device 11 consists of a stroboscope 111 and a stroboscope driving circuit 112 to drive the stroboscope 111 in response to a signal from the computer 8.

The output device 13 is a CRT display to display the result of the arithmetic operation in response to the signal from the computer 8.

Figure 9:
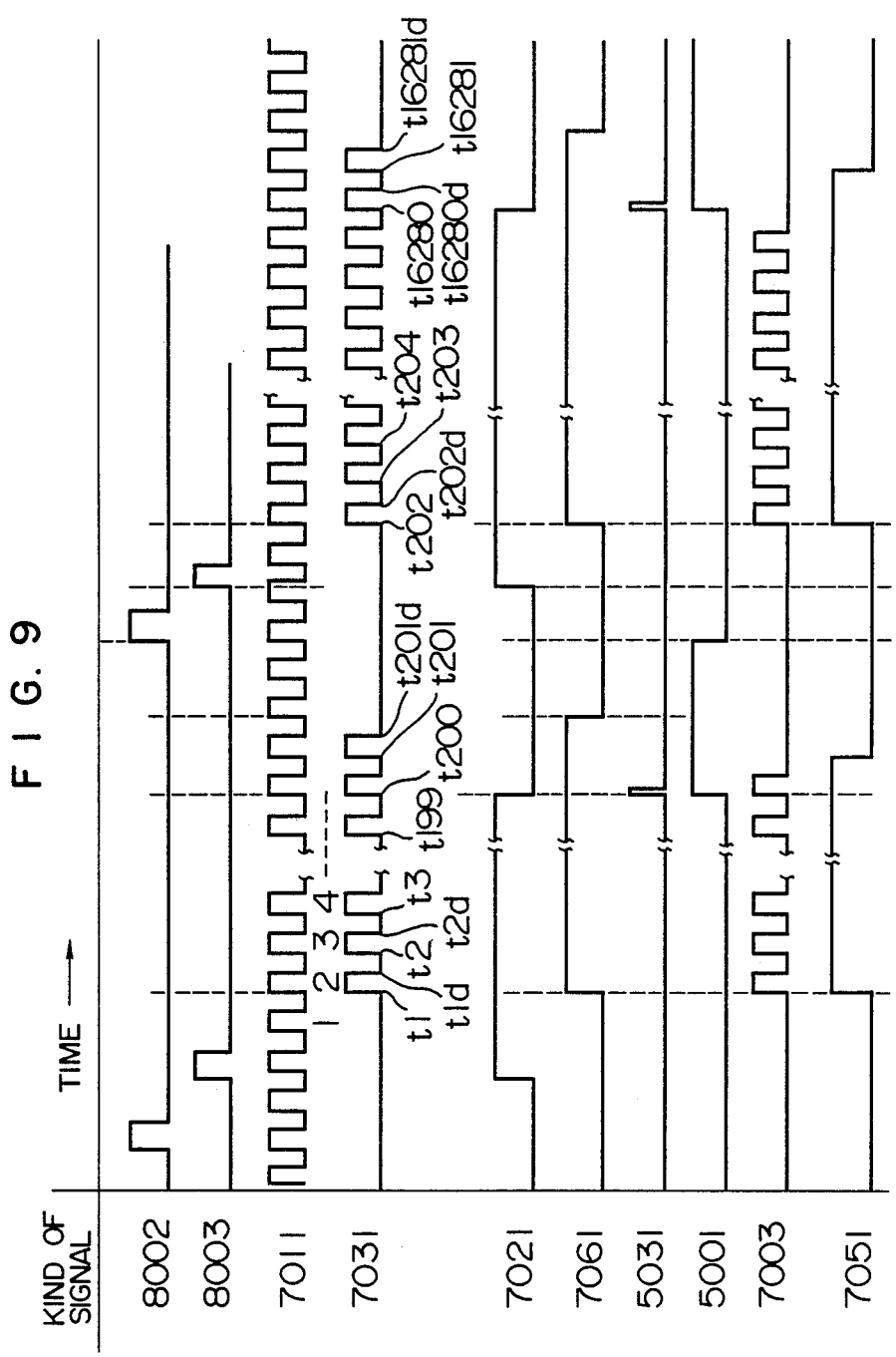
FIGS. 9 and 10 are timing charts for explaining the operations of the first and second embodiments, respectively.

The operation of the apparatus of the embodiment will now be described hereinbelow with reference to a timing chart of FIG. 9.

When the motor is rotated, the pump 103 rotates through the pulley and the lubricator 102 is driven by a spray signal 8006 from the computer 8. The fuel is supplied from the lubricator 102 to the nozzle 101 and injected therefrom, so that a spray material 91 is formed. Thereafter, the driving circuit 112 of the light emitting device 11 allows the stroboscope 111 to emit the light, thereby irradiating the spray material 91.

Figure 3:
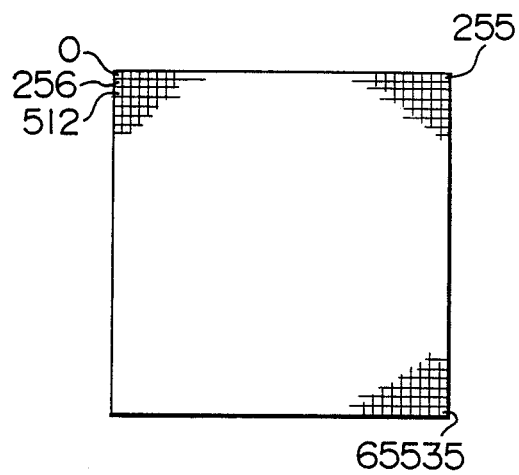

The television camera 1 picks up the image of the spray material 91 and outputs the pickup image to the image A/D converter 2 as a video signal 1001 in which one frame consists of horizontal scanning lines 256. As shown in FIG. 3, the video signal 1001 is sampled in correspondence to the plane coordinates (256 x 256) of each pixel. This image is converted to the digital value, thereby to form the luminance data signal 2002. The luminance data signal 2002 and the address signal 2001 to specify the unit region are output to the image memory 3. The memory 3 stores the image of the spray material 91 sampled at the plane coordinates of each pixel as a plane luminance distribution function $F(X, Y)$ using the address signal 2001 as an address and the luminance data signal 2002 as data. For the address signal 2001, the pulse signal in which a vertical sync signal is a start point (address 0 in the hexadecimal notation) and one horizontal scanning line is divided into 256 dots is output. The address signal 2001, on the other hand, is synchronized with the horizontal sync signal for every 256 pulses.

The computer 8 presets the address $ADW_{ij}(X, Y)$ to store the data of the window $W_i$ shown in FIG. 4 and an end code FFFFH into the address producing memory 6. In this embodiment, the block region radially set from the injection center $(X_0, Y_0)$ of the spray, namely, the line element windows each having a width of unit pixel and each consisting of 200 pixels are set in a manner such that N=81 windows are set at a microinterval $\Delta \theta = 0.25°$ and in the range of $\pm 10°$. All of the adjacent window have the mutually overlapped portions. On the basis of a command from the computer 8, the address $ADW_1(X, Y)$ to store the pixel data of the first window $W_1$ is set into address in the memory 6 as mentioned above. The last address to store the data is address 200. The end code FFFFH indicative of the end of window $W_1$ is set into address 201.

Thereafter, the first address $ADW_m(X, Y)$ of the m-th window $W_m$ is set into address $201 (m-1)+1$ (m is an integer). The end code FFFFH is set into the next address into which the last address $ADW_m(X, Y)$ has been set. These data setting operations are preliminarily executed in response to commands from the computer 8 before the spray material 91 to be measured is detected.

After the image of the spray material 91 has been stored into the image memory 3, the computer 8 presets a counter 704 into address 1, sets the memory 402 into "0", and resets the RS-FF 502 to set the signal level thereof into "0" in response to a preset signal 8005, a reset signal 8002, respectively.

Next, the computer 8 sets the signal level of an RS-FF 702 into "1" by the start signal 8003. Due to this "1" level signal, the signal levels of D-type flip-flops (hereinafter, abbreviated as D-FF) 705 and 706 are sequentially set to "1" synchronously with an oscillation signal 7011 of an oscillator 701. At time $t_1$, AND circuits 703 and 707 output a count-up signal 7031 and an addition command signal 7003, respectively.

Just before time $t_1$, the memory 6 outputs the image address signal 6001 to the end detecting circuit 5 and this signal 6001 corresponds to the address $ADW_1(X, Y)$ stored into address, which is designated by the address signal 7001. At the same time, the image memory 3 outputs the image memory data $F(X, Y)$ of an address designated by the signal 6001 to the cumulative adder 4.

At time $t_1$, the addition command signal 7003 is output and the adder 4 executes the cumulative addition in accordance with the procedure as will be explained hereinbelow. Namely, the address producing memory 6 outputs the image address signal 6001 which is designated by the counter 704 immediately before the leading edge of the addition command signal 7003 (i.e., just before time $t_1$) and the image memory 3 outputs the image luminance signal 3001 (having the value of $$F(X, Y)_j^{W_1})$$

to be stored into the address which is designated by the signal 6001. The operating circuit 401 of the cumulative adder 4 adds the image luminance signal 3001 just before time $t_1$ and a luminance signal 4001 (whose initial value is 0) which is stored into the memory 402 immediately before time $t_1$ and will be output to the computer 8. A resultant addition signal 4011 (having the value of $$\sum_{j=1}^{1} F(X, Y)_j^{W_1})$$

is stored into the memory 402 in response to the trailing edge of the addition command signal 7003 (at time $t_{1d}$). On the other hand, at time $t_1$, the counter 704 increases the count value by "1", so that the count value changes from 1 to 2. Next, when the operating circuit 401 receives the addition command signal 7003 (at time $t_2$), the operating circuit 401 outputs the addition signal 4011 (having the value of $$\sum_{j=1}^{2} F(X, Y)_j^{W_1})$$

and stores it into the memory 402 in response to the trailing edge of the next addition command signal 7003 (at time $t_{2d}$) by the similar procedure.

With an elapse of time such that $t_1, t_{1d}, t_2, t_{2d}, \ldots, t_{199}$, and $t_{199d}$, the sum $$\sum_{j=1}^{199} F(X, Y)_j^{W1}$$

of the luminance signals from 200 pixels is stored into the memory 402.

At time $t_{200}$, the count value of the counter becomes 201 and the memory 6 outputs as the image address signal 6001 FFFFH stored at the address 201 to the end detecting circuit 5.

When the AND circuit 501 of the end detecting circuit 5 receives the signal FFFFH, it outputs a set signal 5011 to set the RS-FF 502. The RS-FF 502 outputs the end detection signal 5001 to the memory 6, counter 7, and computer 8. Thereafter, the RS-FF 502 is reset by the reset signal 8002 from the computer 8. At time $t_{200}$, the D-FF 705 generates an addition signal 7051. When the operating circuit 401 receives the addition command signal 7051, it executes the addition and supplies the result of this addition to the memory 402. The memory 402 then stores the total luminance $$\sum_{j=1}^{200} F(X, Y)_j^{W1}$$

of the first window $W_1$.

At time $t_{201}$, the signal level of the D-FF 705 becomes "0" and the addition command signal 7003 is not output, so that the addition is not executed. However, since the count-up signal 7031 is output, the count value of the counter 704 is increased by "1" and becomes 202.

The computer 8 detects the level of the end detection signal 5001 from the end detecting circuit 5. When this signal level becomes "1", the computer 8 reads the total luminance data $$\sum_{j=1}^{200} F(X, Y)_j^{W1}$$

from the memory 402 after over half a period of the oscillation signal 7011 ($t > t_{200d}$). The integrated value $$\sum_{j=1}^{200} F(X, Y)_j^{W1}$$

i of the luminances in the first window $W_1$ is stored into the memory 81 of the computer 8.

Next, the computer 8 outputs the reset signal 8002 to clear the memory 402 and generates the start signal 8003.

At time $t_{202}$, when the address generating counter 7 generates the addition command signal 7003, the adder 4 calculates the total luminance $$\sum_{j=1}^{200} F(X, Y)_j^{W2}$$

of the next window $W_2$. The total luminance of each window $W_i$ is sequentially obtained in the manner similar to the above.

At time $t_{16281}$, the adder 4 calculates the total sum $$\sum_{j=1}^{200} F(X, Y)_j^{W81}$$

of the luminances of window$_{81}$. This value is stored into the memory 402 at time $t_{16281d}$. When the computer 8 detects that the level of the end detection signal 5001 is "1", it reads out the total luminance data $$\sum_{j=1}^{200} F(X, Y)_j^{Wi}$$

from the memory 402 and stores this data into the memory 81. Thus, each luminance integration data of the windows $W_1$ to $W_{81}$ can be derived.

According to the embodiment, one period of the oscillation signal 7011 of the counter 7 has been set to 0.5 $\mu$sec. Therefore, it takes 104 $\mu$sec to obtain the luminance of a single window and it takes 8424 $\mu$sec to derive eighty-one results of the integrations of 16281 pixels. Namely, the luminance integration of the overlapped window can be obtained at a speed higher than the time ($=1/60$ sec) which is required for the image A/D converter 2 takes in the image of one frame.

With the result of the embodiment, the integrated value $$\sum_{j=1}^{200} F(X, Y)_j^{Wi}$$

{referred to as F(W$_i$)} of each window W$_i$ indicates the luminances added due to constant line elements for every discrete $\theta$. The one-dimensional luminance distribution function g($\theta$) can be quantized as a function of F(W$_i$) since $\theta$ varies in dependence on "i" as mentioned above. Namely, g($\theta$) can be expressed as follows.

$$g(\theta) = F(W_i) \tag{3}$$

By use of this result, the computer 8 can allow the output device 13 to draw the graph of the one-dimensional luminance distribution function g($\theta$) to the angle $\theta$ of orientation.

The function g($\theta$) derived as mentioned above represents the average brightness of one block region, i.e., window which was set in the direction of radius vector with respect to each $\theta$. g($\theta$) indicates the average luminance distribution characteristics obtained in the direction of angle of orientation and its value denotes the much or less of the spray amount or the presence or absence of the spray. The value of g($\theta$) represents the spray concentration. Therefore, the distribution characteristics of the spray material is expressed by the one-dimensional luminance distribution function g($\theta$). The concentration distribution of the spray material 91 can be evaluated by extracting the characteristic amount of g($\theta$).

Figure 6:
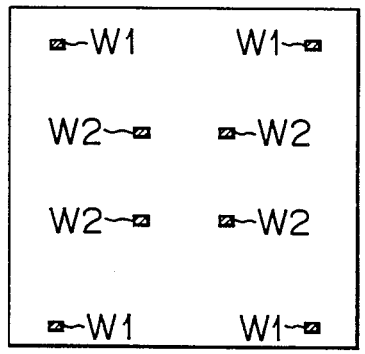
FIGS. 6 and 7 are explanatory diagrmas showing an example of setting the shape of the window $W_i$.
Figure 7:
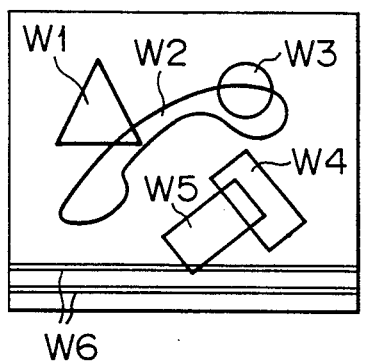

Although a series of pixels have been used as a form of window in the embodiment, the discrete pixels may be also set as the same window into the address producing memory 6 as shown in FIG. 6. On the other hand, although the window W$_i$ has the linear shape, it may also have an arbitrary plane shape as shown in FIG. 7.

For the operation, the luminance levels of multigradations in the window W$_i$ have been added. However, by adding the binarized image, the area or length in the window can be measured. In this case, the cumulative adder 4 may be replaced by a counter.

Further, the window operating order corresponds to the order of the addresses in the memory 6. However, the operations for only arbitrary windows can be also executed. For the procedure in this case, the preset signal 8005 is output from the computer 8 and the counter 704 is set into the head address of the selected window, thereby obtaining the total luminance of the selected window in a manner similar to the first embodiment.

Figure 8:
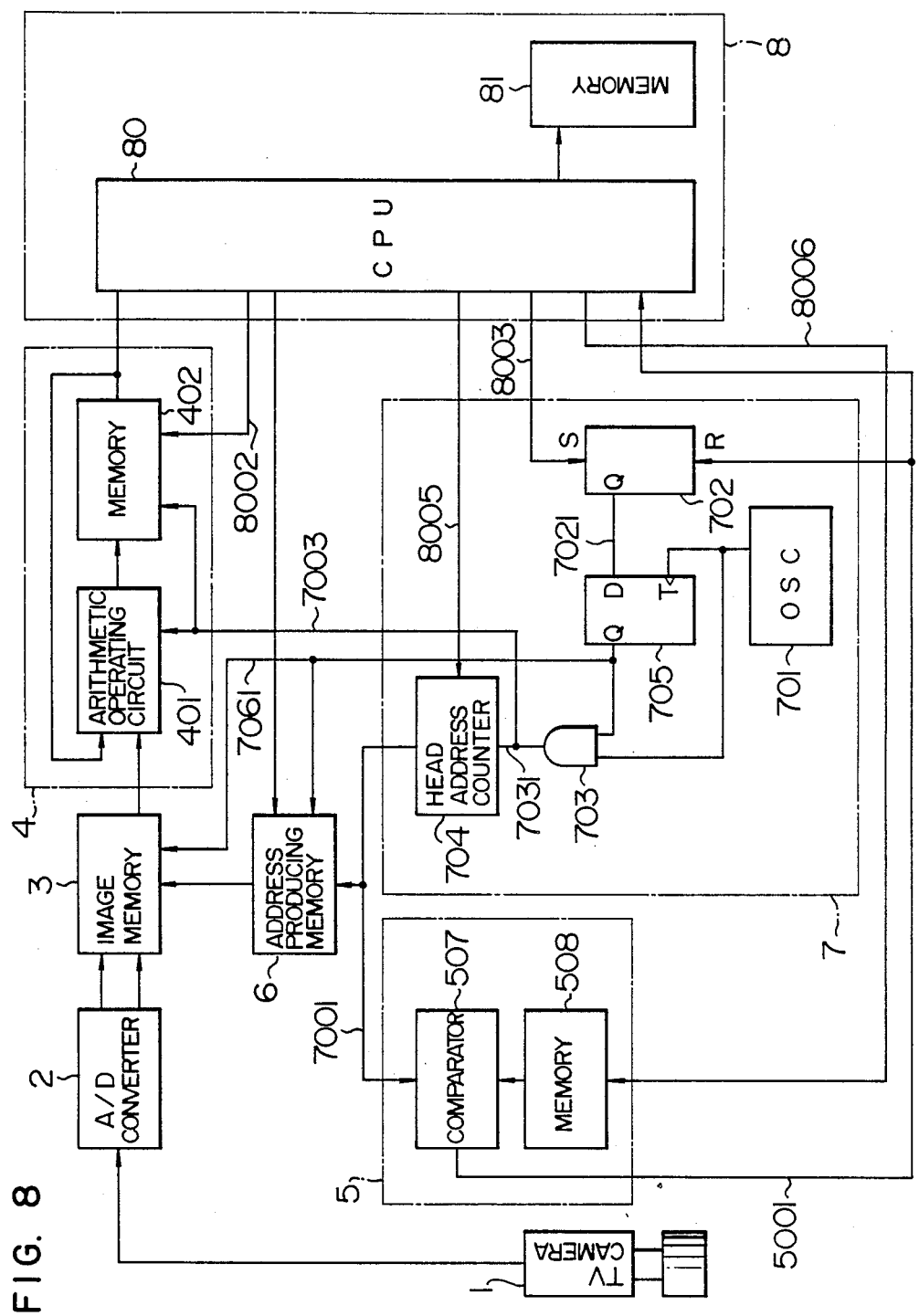
FIG. 8 is a block diagram showing a constitution of the second embodiment.
Figure 10:
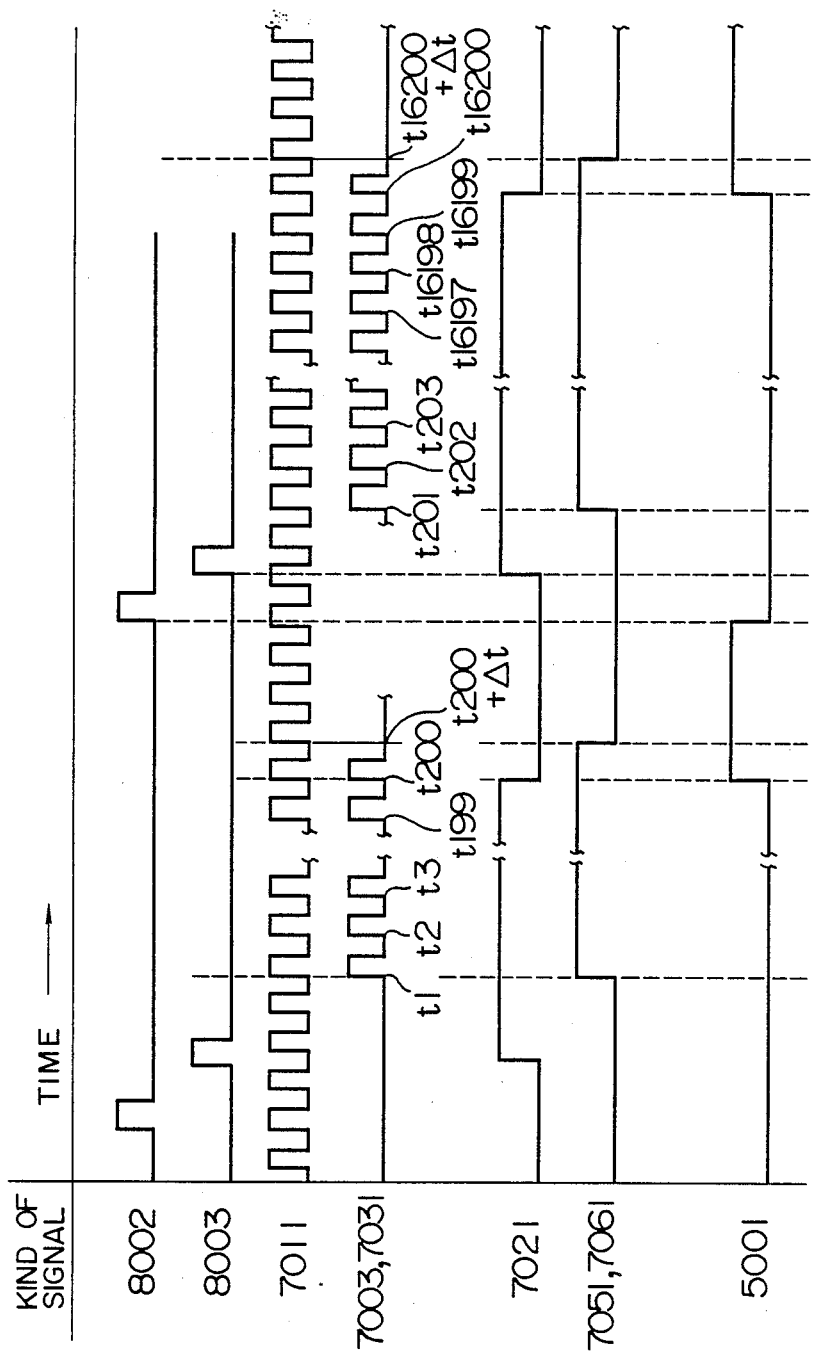

The second embodiment will now be described. In this embodiment, the end detecting circuit 5 is constituted as shown in FIG. 8. FIG. 10 shows a timing chart for this apparatus. The other portions are substantially similar to the first embodiment. The end detecting circuit 5 comprises a comparator 507 and a memory 508. In the case where the same object as in the case of the first embodiment is measured, for example, the special value indicative of the address at the end of the addition of the counter is set into the memory 508 by the computer 8 at time $t_{201}$ (by the signal 8006). The comparator 507 compares the count value of the counter 704 with the above-mentioned special value in the memory 508. FIG. 10 shows the timing chart for this operation. These values coincide at time $t_{200}$. The comparator 507 outputs an end detection signal which resets the RS-FF 702. At the same time, the adder 4 executes the 200th addition $$\sum_{j=1}^{200} F(X, Y)^{W1}$$

and the result of this addition is stored into the memory 402. When the computer 8 detects the end detection signal 5001, it stores this result into the memory 81. The signal level of the D-FF 705 becomes "0" at time $t_{200+\Delta t}$ and there is no need to execute the counting and adding operations.

According to the second embodiment, there is no need to arrange the D-FF 706 and AND circuit 707.

Although the counter 704 sequentially counts up the count value in the first and second embodiments, the invention can be similarly realized even in the case where the counter 704 counts down as well.

We claim:

1. An image processing system, including an image sensor which is sensitive to an image of an object, for performing a cumulative integrating processing of a luminance of at least one block region to be measured within the image, in accordance with a luminance of the image obtained by said image sensor, comprising:
    image memory means, coupled to the image sensor, for storing a luminance of each pixel constituting the image obtained by said image sensor as luminance data, at an address corresponding to a position of said each pixel on said image;
    a microcomputer for specifying addresses of said image memory means corresponding to positions on said image of each pixel constituting said at least one block region to be measured;
    address output means for storing said addresses specified by said microcomputer, and for outputting said address data corresponding to an input count data to said image memory means;
    count generating means for sequentially producing said count data to said address output means by counting up or down said count data in a predetermined direction to address said address output means to sequentially output address data to said image memory means; and
    arithmetic operating means for sequentially adding the luminance data outputted by said image memory means in correspondence with said address data outputted by said address output means.

2. A system according to claim 1, wherein said count generating means includes oscillating means for beginning an oscillating signal in response to a start signal, and a counter responsive to the oscillating signal provided by said oscillating means for outputting said count data.

3. A system according to claim 2 wherein said microcomputer generates said start signal supplied to said count generating means, and evaluates a luminance distribution of said image by inputting the luminance cumulated value of said at least one block region from said arithmetic operating means.

4. A system according to claim 2, further comprising:
    completion detecting means for stopping a counting operation of said counter upon detection of completion of outputting all the address data stored in said address producing memory.

5. A system according to claim 1, further comprising:
    completion detecting means for detecting that all the address data stored in said address output means has been output.

6. A system as in claim 5 wherein said address producing memory means stores a value indicative of an end of said block at least at one location thereof and said completion detecting means detects said value to determine that all addresses have been output.

7. An apparatus for evaluating a pattern condition of an object to be measured based on a luminance thereof, comprising:
    image detecting means for acquiring an image of said object to be measured and for generating a signal having a value representative of a luminance of a pixel constituting said image;
    A/D converter means for converting the signal from said image detecting means into a digital value and for generating luminance data;
    image memory means for storing the luminance data from said A/D converter means at an address corresponding to a position of each pixel on said image;
    a microcomputer for outputting addresses of said image memory means corresponding to positions of each of a plurality of pixels on said image constituting at least one block region for evaluating the pattern condition of said object to be measured, and for generating a start signal to initiate said evaluating;
    address generating counter means for sequentially generating count data while increasing or decreasing the count data in a predetermined direction in response to a start signal generated by said microcomputer;
    address producing memory means for storing said addresses outputted by said microcomputer and for outputting said address data to said image memory means corresponding to said count data sequentially outputted by said address generating counter means; and
    cumulative adder means for obtaining and outputting a luminance cumulated value of at least one block region by cumulatively adding the luminance data outputted from said image memory means when addressed by said address producing memory means, in correspondence with said address data sequentially output from said address producing memory means;

said microcomputer including means for evaluating the pattern condition of said object to be measured based on the luminance cumulative value of said at least one block region outputted from said cumulative adder means.

8. A system according to claim 7, wherein said pattern of said object to be measured is a fuel spray pattern injected by a fuel injector of an internal combustion engine.

9. A system according to claim 7, further comprising: completion detecting means for detecting that all the address data stored in said address output means has been outputted.

10. An image processing system for calculating a cumulative luminance of at least one block region to be measured and located within an image, comprising:

image sensor means for detecting a luminance of an object;

image memory means, coupled to said image sensor means, for storing said luminance at addresses corresponding to a position of said each of a plurality of pixels forming said image;

means for specifying addresses of said image memory means corresponding to a position of said at least one block;

count generating means for sequentially producing count data during an image processing operation;

address output means for receiving and storing said addresses specified by said specifying means, and receiving said count data from said count generating means, for reading out stored addresses corresponding to said count data, and providing said addresses to said image memory means to read out stored luminance values at said addresses; and arithmetic operating means for receiving said resultant address data sequentially generated by said count data generating means and for sequentially adding the luminance data outputted by said image memory means in correspondence with said address data outputted by said address output means.

11. A system as in claim 10 wherein said addresses specified by said specifying means are calculated in advance of said image processing operation.

12. A system as in claim 10 wherein said address producing memory means stores a value indicative of an end of said block at least at one location thereof.

13. A system as in claim 12, further comprising end detecting means for detecting said value indicative of an end of said block and for stopping said sequential adding by said arithmetic operating means in response thereto.

14. An method for processing an image to calculate a cumulative luminance of at least one block region to be measured and located within the image, comprising the steps of:

detecting a luminance of an object;

storing said luminance in an image memory at addresses corresponding to a position of said each of a plurality of pixels forming said image;

specifying addresses of the image memory corresponding to a position of said at least one block;

sequentially producing count data during an image processing operation;

receiving and storing the addresses specified by said specifying step and receiving the count data from said sequentially producing step, for reading out stored addresses corresponding to said count data, and providing said addresses to the image memory to read out stored luminance values at said addresses; and receiving said resultant address data sequentially generated and sequentially adding the luminance data outputted by the image memory in correspondence with said address data output.

* * * * *